Figure 1:
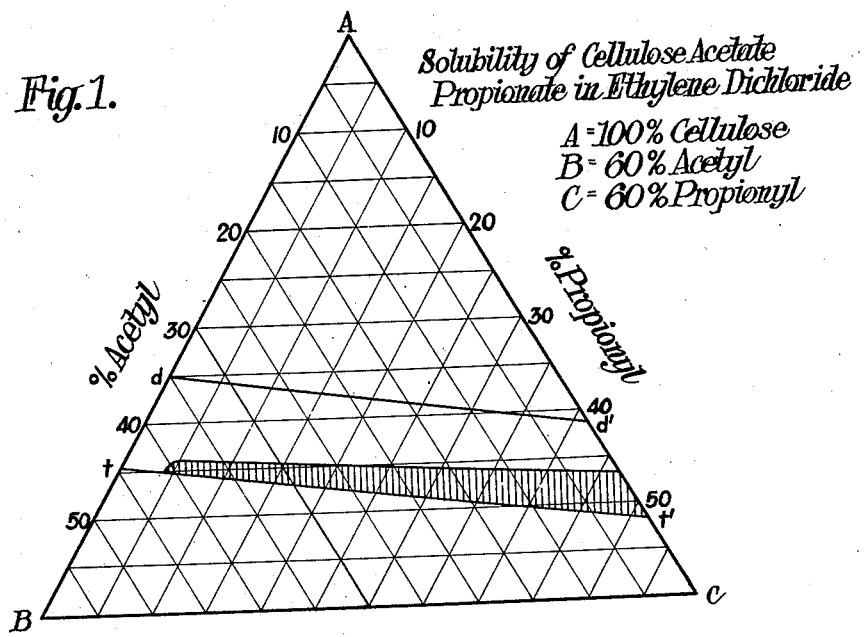
Figure 2:
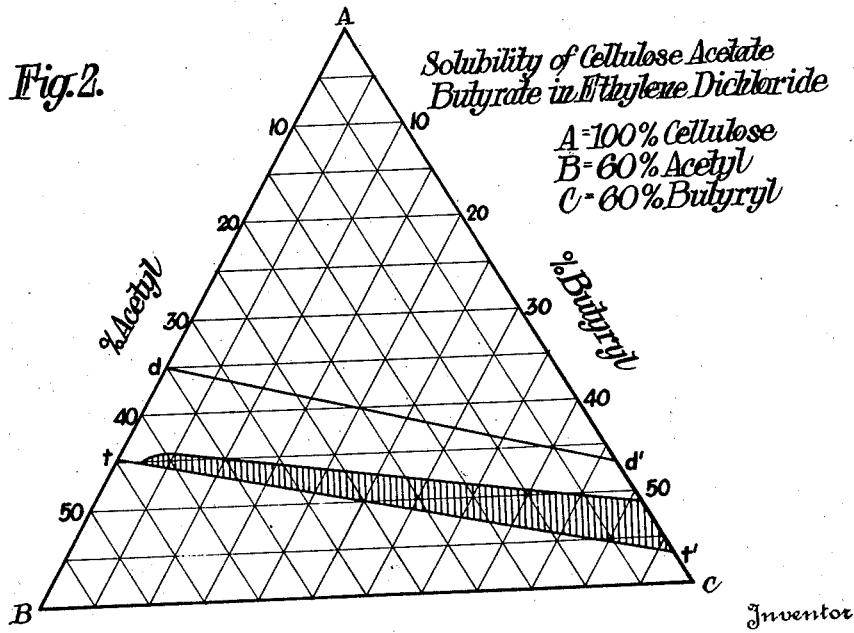

April 27, 1937.  C. J. MALM  2,078,261

COLLOIDIZING MIXED ESTERS OF CELLULOSE

Filed Jan. 3, 1935

Inventor:
Carl J. Malm,
By N. M. Perrins
Daniel I. Mayne
Attorneys.

Patented Apr. 27, 1937

2,078,261

UNITED STATES PATENT OFFICE 2,078,261

COLLOIDIZING MIXED ESTERS OF CELLULOSE

Carl J. Malm, Rochester, N. Y., assignor, by mesne assignments, to Eastman Kodak Company, Jersey City, N. J., a corporation of New Jersey Application January 3, 1935, Serial No. 258

7 Claims. (Cl. 106—40)

This invention relates to the colloidizing of a mixed ester of cellulose containing acetyl groups and acyl groups of 3-4 carbon atoms which has been hydrolyzed beyond its solubility in ethylene chloride, with a mixture of ethylene chloride and a lower alcohol, the alcohol being present in less than the amount which forms an azeotrope with ethylene chloride.

This application is a continuation in part of my copending application Serial No. 551,545 filed July 17, 1931, which matured into Patent No. 2,006,362.

It has previously been known to colloidize cellulose acetate with acetone to form sheets, filaments or for that matter any colloidized product. However, when it is attempted to colloidize mixed esters with acetone, some of the sheets formed are found to be hazy, some being only slightly hazy while other samples had a marked haziness. Also it was found that sheets of mixed esters which differed only in the proportions of the radicals present, varied to an almost unbelievable extent in their flexibility. For instance samples of cellulose acetate propionate, in which the proportions of acetyl and propionyl radicals differed, were coated from their acetone solution in sheet form. These sheets were tested on a modified Schopper fold-tester (which is commonly used to determine the flexibility of cellulose derivative sheeting). It was found that the number of folds which would be tolerated by the various samples ranged from 0 to 9.

One object of my invention is to provide a method of preparing sheets or skins of cellulose esters which have markedly greater flexibilities than those exhibited by sheets or skins of the same thickness at the present time. Other objects will appear herein.

I have found that the sheets or skins prepared from either cellulose acetate propionate or cellulose acetate butyrate, which has been hydrolyzed beyond its solubility in ethylene chloride alone, when dissolved in ethylene chloride-lower alcohol in which the alcohol is present in less than an azeotropic amount and then coated out in the form of a sheet or skin exhibits remarkable flexibility even when a plasticizer is omitted. My theory as to the cause of the high flexibility is that by having the alcohol present in a proportion smaller than that in its azeotrope with ethylene chloride, the alcohol content of a skin freshly coated out will decrease and the film will gel before all the solvent has evaporated off. When on the other hand, a proportion of alcohol at least equal to the amount in its azeotrope is employed, the alcohol content of the skin will increase during evaporation, no geling will occur and the enhanced flexibility is not obtained.

I have found that the further the mixed ester is hydrolyzed from the point where it is soluble in pure ethylene chloride, the higher the flexibility which is obtained although there is a maximum amount of hydrolysis beyond which opaque skins are obtained.

The mixed esters of cellulose which may be employed in the present invention are any of the hydrolyzed undegraded cellulose acetate propionates, acetate butyrates or acetate propionate butyrates which are originally soluble in ethylene chloride. These esters may be prepared for example in accordance with the disclosures of U. S. Patent No. 1,800,860 of Clarke and Malm or of their application Serial No. 520,149 filed March 4, 1931. The hydrolysis of these esters may be carried out in accordance with the procedure described and claimed in Malm and Fletcher application Serial No. 551,546 filed July 17, 1931.

The accompanying drawing is triangular graphs showing the solubility regions of cellulose acetate propionate and cellulose acetate butyrate in pure ethylene chloride. The line $tt'$ extending from 44.8 on the acetyl line to 52 on the propionyl or 57 on the butyryl represents the fully esterified or tri-esters of cellulose. The line $dd'$ represents the di-esters of cellulose. It may be seen that a cellulose acetate propionate having an acetyl content of 22% and a propionyl content of 25% would be soluble in pure ethylene chloride while an ester having an acetyl content of 20% and a propionyl content of 22% would be insoluble therein and would be capable of use in accordance with the present invention. The shaded sections of the triangular graphs indicate the compositions of the cellulose acetate propionates or cellulose acetate butyrates which are soluble in pure ethylene chloride.

The maximum amount of hydrolysis beyond which opaque skins are obtained is partially dependent upon the propionyl (or butyryl) content of the esters, the esters of comparatively high propionyl (or butyryl) content being susceptible of further hydrolysis before this point is reached than the esters of comparatively high acetyl content. Roughly, it may be said that the maximum amount of hydrolysis which may be employed usually gives esters approaching the di-ester stage.

As the lower monohydroxy alcohols differ in the proportions with which they form azeotropic mixtures with ethylene chloride, the maximum proportion of the alcohol which may be employed depends on this proportion in each case. The maximum proportion of methyl alcohol which may be used in accordance with my invention is 33% by weight, of ethyl alcohol 26% by weight and of normal propyl alcohol 15% by weight. In general it is advisable to use as little alcohol as possible, however the amount employed should be sufficient to form a perfect solvent for the cellulose ester with the ethylene chloride.

Hydrolyzed cellulose acetate propionates and butyrates of the acetyl, propionyl and butyryl contents given were dissolved in ethylene chloride-methyl alcohol mixtures, as indicated, in the proportion of 1 part of ester to 7 parts of solvent and were coated out in the form of skins or sheets having flexibilities as follows:

*Flexibility in folds*

| Acetyl | Propionyl | Butyryl | Ethylene chloride-methyl alcohol 90:10 | Ethylene chloride-methyl alcohol 80:20 |
|---|---|---|---|---|
| Percent | | Percent | | |
| 31.7 | | 11.4 | 15 | 14 |
| 28.4 | | 11.6 | 85 | 25 |
| 27.2 | | 16.8 | 17 | 11 |
| 24.5 | | 17.0 | 45 | 18 |
| 10.9 | | 37.0 | 22 | 22 |
| 9.8 | | 36.4 | 31 | 25 |
| 9.4 | | 33.8 | 57 | 41 |

*Flexibility in folds*

| Acetyl | Propionyl | Butyryl | Ethylene chloride-methyl alcohol 90:10 |
|---|---|---|---|
| Percent | Percent | | |
| 34.2 | 8.7 | | 13 |
| 32.5 | 8.0 | | 36 |
| 28.0 | 16.5 | | 10 |
| 26.5 | 15.4 | | 15 |
| 24.8 | 14.5 | | 40 |
| 19.8 | 22.5 | | 21 |
| 12.0 | 29.2 | | 24 |

It may be seen from the above results that as the ester is hydrolyzed away from the point where it is soluble in pure ethylene chloride, a higher flexibility is obtained. Also in many cases where the amount of alcohol was increased the flexibility is decreased.

Obviously where the sheets or skins exhibit flexibilities as shown there is usually no necessity for employing a plasticizer although if the operator desires to increase the water resistance, resistance to burning or other properties of the film a compatible plasticizer, known for cellulose acetate, such as triphenyl phosphate may be employed therein. If desired the operator may add compatible plastic materials such as cellulose esters, resins, etc., to the composition.

The sheets produced according to my process may be used in any instance where cellulose ester sheeting is employed at the present time. Due to its high flexibilities, it is valuable for the manufacture of photographic film and of thin sheeting for wrapping purposes. These sheets are adapted for reinforcing materials, especially those of a breakable nature, such as paper, glass and wood as well as leather, metal etc. Instead of applying the sheet to the material to be reinforced, the solution thereof in the ethylene chloride-alcohol may be flowed or sprayed thereon and in this manner attach itself to the material to be reinforced. This composition may also be used for lacquering or overcoating in general, or for the manufacture of artificial silk, artificial leather, etc. Either the solution of the ester or the sheet or films prepared therefrom may be employed for the electrical insulation of metallic conductors. Various other uses of the present invention will suggest themselves to those skilled in the art. It will be seen from the data given above that sheets prepared in accordance with the present invention all exhibited a tolerance of at least 10 folds, while in some cases sheets having a flexibility of more than 50 folds were prepared.

Having thus described my invention, what I declare is new and desire to secure by Letters Patent of the United States is:

1. The process of preparing a colloidized product from a cellulose acylate containing acetyl groups and acyl groups of 3–4 carbon atoms which acylate has been hydrolyzed beyond solubility in pure ethylene chloride but not to a point which would cause opaqueness in the product, which comprises dissolving the cellulose acylate in a mixture of ethylene chloride and a lower monohydroxy alcohol, the latter being present in less than the amount of its azeotrope with ethylene chloride, imparting the desired shape to the solution and then evaporating off the solvent therefrom.

2. The process of preparing a highly flexible sheeting from a cellulose acylate containing acetyl groups and acyl groups of 3–4 carbon atoms which acylate has been hydrolyzed beyond solubility in pure ethylene chloride but not enough to cause opaqueness in the sheeting, which comprises dissolving the cellulose acylate in an ethylene chloride-methyl alcohol mixture in which the latter is present in less than an azeotropic amount and then depositing the resulting solution on a film forming surface and evaporating the solvent therefrom.

3. The process of preparing a colloidized cellulose acetate propionate product from an acetate propionate which has been hydrolyzed beyond solubility in pure ethylene chloride but not enough to cause opaqueness in the resulting product which comprises dissolving the cellulose acetate propionate in ethylene chloride-lower monohydroxy alcohol, the latter being present in less than an azeotropic amount and then shaping the solution and evaporating off the solvent therefrom.

4. The process of preparing a colloidized cellulose acetate butyrate product from an acetate butyrate which has been hydrolyzed beyond solubility in pure ethylene chloride but not enough to cause opaqueness in the resulting product which comprises dissolving the cellulose acetate butyrate in ethylene chloride-lower monohydroxy alcohol, the latter being present in less than an azeotropic amount and then shaping the solution and evaporating off the solvent therefrom.

5. A composition of matter comprising a cellulose ester having acetyl groups and acyl groups of 3–4 carbon atoms which ester has been hydrolyzed beyond solubility in pure ethylene chloride but not sufficiently to cause opaqueness in a product prepared from this composition, dissolved in ethylene chloride-lower alcohol the latter being present in less than an azeotropic amount.

6. A composition of matter comprising a cellulose ester having acetyl groups and acyl groups of 3–4 carbon atoms which ester has been hydrolyzed beyond solubility in pure ethylene chloride but not sufficiently to cause opaqueness in a product prepared from this composition, dissolved in ethylene chloride-methyl acohol the latter being present in less than an azeotropic amount.

7. A highly flexible sheet resulting from the forming of sheeting from a cellulose acylate containing acetyl groups and acyl groups of 3–4 carbon atoms which has been hydrolyzed beyond solubility in pure ethylene chloride but not sufficiently to cause opaqueness in the resulting product dissolved in a solvent comprising a mixture of 9 parts of ethylene chloride and 1 part of methyl alcohol.

CARL J. MALM.